United States Patent [19]
Fraidlin et al.

[11] Patent Number: 6,038,142
[45] Date of Patent: *Mar. 14, 2000

[54] FULL-BRIDGE ISOLATED CURRENT FED CONVERTER WITH ACTIVE CLAMP

[75] Inventors: Simon Fraidlin, Plano, Tex.; Victor Yakushev; Valery I. Meleshin, both of Moscow, Russian Federation

[73] Assignee: Lucent Technologies, Inc., Murray Hill, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 09/095,807

[22] Filed: Jun. 10, 1998

[51] Int. Cl.⁷ .......................... H02M 3/335; H02M 3/24
[52] U.S. Cl. ................. 363/17; 363/98; 363/132
[58] Field of Search ................. 365/17, 16, 132, 365/98, 97, 56

[56] References Cited

U.S. PATENT DOCUMENTS

| | | | |
|---|---|---|---|
| 4,864,483 | 9/1989 | Divan | 363/37 |
| 5,245,520 | 9/1993 | Imbertson | 363/17 |
| 5,434,767 | 7/1995 | Batarseh et al. | 363/16 |
| 5,654,880 | 8/1997 | Brkovic et al. | 363/17 |
| 5,719,754 | 2/1998 | Fraidlin et al. | 363/17 |

*Primary Examiner*—Peter S. Wong
*Assistant Examiner*—Rajnikant B. Patel
*Attorney, Agent, or Firm*—Locke Liddell & Sapp LLP

[57] ABSTRACT

The present invention relates to a power converter which uses pulse width modulated (PWM) control to provide a galvanically isolated dc output. Topologically, the converter uses a full-bridge switching scheme with a boost converter, and can be referred to as an isolated boost converter. The converter includes an ancillary circuit comprised of a switch transistor and a series connected capacitor which act as an active clamp. The converter of the present invention allows for a number of significant advantages. The converter provides zero voltage transitions in all switches, thereby preventing losses due to leakage currents in the switching transistors during switching transitions. The converter further provides a path for transformer magnetizing current flow, and also clamps the leakage inductance related to voltage spikes across the switches. These advantages allow the converter to keep stress on the active components low which makes the circuit more efficient. The circuit of the present invention has a simple structure which gives it good power density and makes it inexpensive, and is also capable of high frequency operation.

8 Claims, 5 Drawing Sheets

TIMING DIAGRAM OF THE SWITCHING PROCESSSES IN THE FULL-BRIDGE ISOLATED CURRENT CONVERTER WITH ACTIVE CLAMP CIRCUIT.

FULL-BRIDGE ISOLATED CURRENT FED CONVERTER WITH ACTIVE CLAMP

This invention relates to power supplies and converters. More particularly, the invention relates to a full-bridge isolated boost converter with an active clamp.

BACKGROUND OF THE INVENTION

A variety of different topologies have been developed and employed to provide isolated AC-to-DC and DC-to-DC power conversion. A sub-group of these converter topologies, sometimes called Current Fed topologies are in many respects advantageous over another sub-group, the so-called Voltage Fed converter topologies. These advantages relate to a potential circuit simplicity and its smaller component count. Indeed, a single stage PFC (power factor corrected) isolated AC-to-DC converter (realized in Current Fed topology) is often more cost effective than a traditional two stage solution. However, in order to realize these advantages, it is necessary to overcome the inherent problem in the Current Fed topologies—containment and proper disposal of energy stored in the leakage and magnetizing inductances of the isolation transformer.

Many methods were developed to accomplish this task with a varying success. The drawbacks of these circuits are: uneven stress distribution between the switches; DC current bias in the power transformer; and, necessity of employing some damping (snubbing) circuits. These drawbacks limit the use of these circuits to relatively low power.

The Push-Pull Boost current fed topology has been widely described. Its simplicity is negated by such drawbacks as high voltage stress on the switches, and necessity of employing damping (snubbing) circuits to cope with voltage spikes caused by the unclamped leakage inductance of the transformer.

Another example of the full bridge topology utilization are Current Fed Full-Bridge converters which utilize some ancillary circuitry to facilitate zero voltage transition (ZVT) operation of the bridge switches. In these converters, the ancillary circuit is placed in the secondary. This ancillary circuit is comprised of two MOSFETs, resonant inductor and capacitor which provide ZVT conditions for the primary bridge switches, thus enhancing their switching efficiency. However, the benefits of it are negated by the necessity of using inefficient bridge rectifier circuit and by the four series/parallel secondary connected MOSFETs. The circuit overall is complex and component extensive (expensive).

The common drawback of the above mentioned circuits is an inadequate provision for the transformer magnetizing current flow and the necessity of additional damping or snubbing circuitry to cope with voltage spikes caused by the unclamped transformer leakage inductance.

An active clamp circuit comprised of the capacitor in series with the MOSFET has been proposed for use with a variety of converter circuits in the past. The capacitor/transistor active clamp circuit has been applied to a single ended forward converter and to DC-to-DC non-isolated boost converters. However, these do not consider the Isolated Current Fed Full-Bridge which operates in a very specific manner.

An Isolated Current Fed converter topology is needed that provides for transformer magnetizing current flow, and does not require additional damping, or snubber circuitry, to cope with voltage spikes caused by unclamped transformer leakage inductance. In addition, such converter should exhibit soft switching operation for high efficiency and low noise.

SUMMARY OF THE INVENTION

In accordance with the present invention, a power converter which converts the input voltage and provides an isolated DC voltage output is provided. The power converter includes an isolation transformer which has its primary winding energized by a full-bridge switching network comprised of four MOSFET switches. The action of full-bridge switches also energizes the inductor connected between the input voltage source and the full-bridge. The isolation transformer secondary is coupled to a full-wave rectifier. An output capacitor coupled to the rectifier circuit provides output voltage filtering.

The power converter also includes the active clamp circuit comprised of a MOSFET switch connected in series with a capacitor. The active clamp circuit is connected across the full-bridge and provides a path for magnetizing current flow and leakage inductance clamping. Its action also provides for zero voltage transition in all switches of the circuit.

The power converter also includes a controller and a monitoring circuit. The controller drives the circuit active switches (MOSFETs) in such a way as to provide regulated DC voltage at the output. The monitoring circuit monitors voltage across specific points of the switching network and signals the controller when zero voltage condition is present such that the controller can drive the MOSFETs. A special circuit may be added to precharge the output capacitors at start up to prevent excessive current. One of possible precharging circuits consists of a special secondary winding in the boost inductor which is coupled to the output capacitor through a rectifier diode.

The features and advantages of the invention will become more readily understood from the following detailed description taken in conjunction with the appended claims and attached drawing wherein:

DESCRIPTION OF THE PREFERRED EMBODIMENTS

Figure 1:
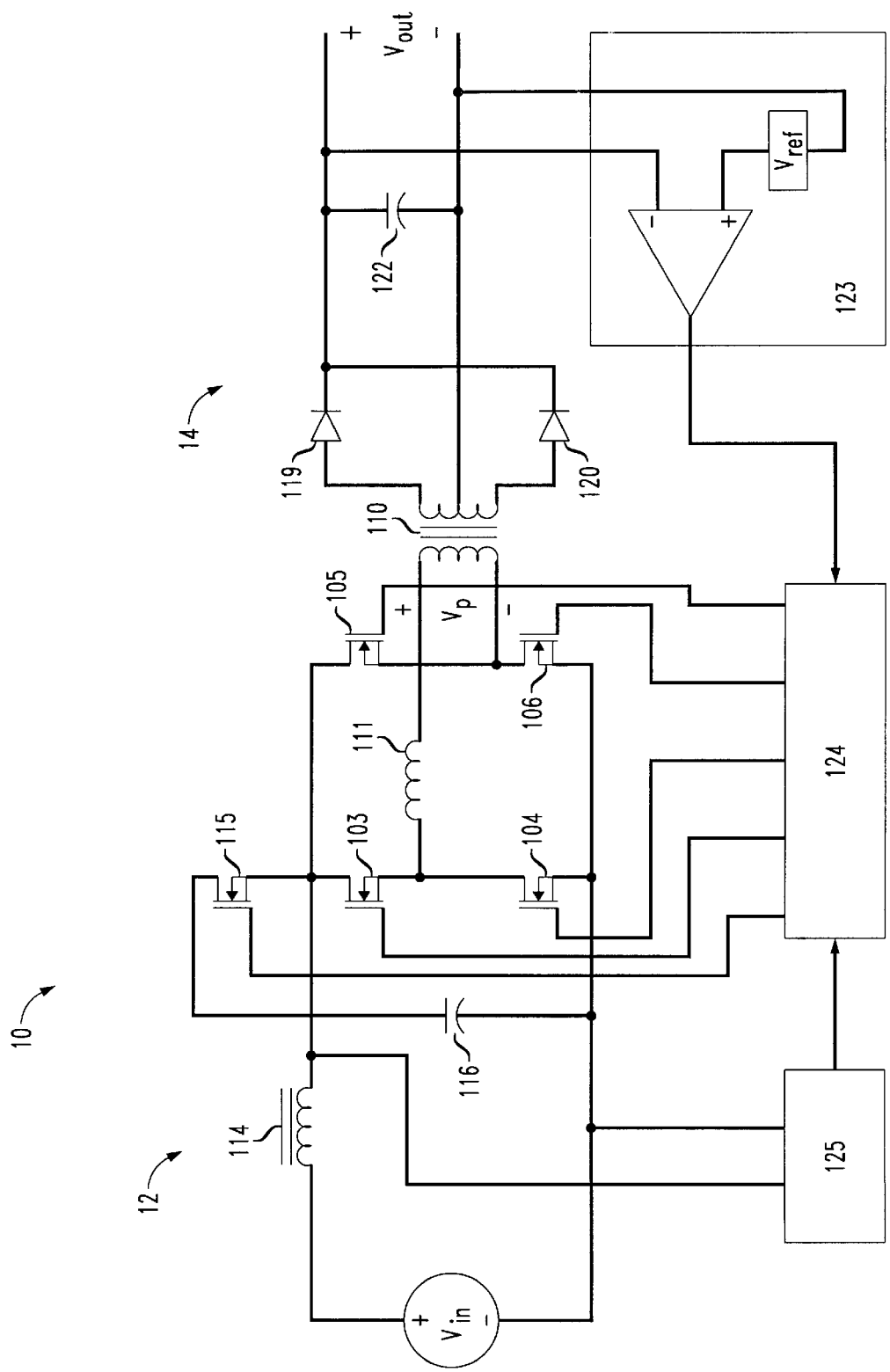
FIG. 1 is a converter circuit according to the present invention.

FIG. 1 shows a full-bridge converter according to the present invention. Converter 10 operates similarly to traditional full-bridge converter topologies to supply constant output voltage $V_{out}$ from source $V_{in}$. Source $V_{in}$, which can be either a pure DC source or a rectified, nonfiltered AC line voltage, is applied across transformer 110 by switching circuit 12. Transformer inductance is shown in FIG. 1 as lump inductance 111. Switching circuit 12 applies source $V_{in}$ across transformer 110 by closing MOSFET switches 103 and 106 alternately with switches 104 and 105. Switches 103, 104, 105, and 106 are controlled by PWM controller 124 which regulates the output voltage by varying the duty cycles of switches 103 and 106 and switches 104 and 105. When switches 103 and 106 are closed by PWM controller 124 the transformer voltage $V_p$ is proportional to $V_{in}$. Similarly, when switches 104 and 105 are closed by PWM controller 124 the transformer voltage $V_p$ is proportional $-V_{in}$.

Boost inductor 114 is connected between source $V_{in}$ and the DC node of the bridge formed by switches 103, 104, 105, and 106. Boost inductor 114 makes converter 10 a "current fed" converter by supplying current to the bridge while switches 104 and 105 are turned on. The active clamp circuit of converter 10 is formed by MOSFET clamping switch 115 and clamping capacitor 116.

The action of switching circuit 12 provides the voltage across transformer 110 which powers output circuit 14. The voltage induced across transformer 110 is proportional to the ratio of the number of turns in the windings of transformer 110. During the portion of a cycle when switches 103 and 106 are closed, transformer voltage $V_p$ is induced in the center tapped winding of transformer 110. In this phase of the output, transformer voltage $V_p$ is positive, resulting in the forward biasing of diode 119 and reverse biasing diode 120, which act as rectifying diodes in output circuit 14. This allows current to flow in the portion of the center tapped winding associated with diode 119 while current is prevented from flowing in the portion of the center tapped winding associated with diode 120. During the other phase of the output, when switches 104 and 105 are closed, transformer voltage $V_p$, across transformer 110, is negative. This induces a voltage across transformer 110 which reverse biases diode 119 and forward biases diode 120. With diode 120 forward biased, current flows through only the portion of the center tapped winding associated with diode 120. The alternating voltage across transformer 110 produced by switching circuit 12, when rectified through diodes 119 and 120, is filtered by capacitor 122 to then provide power to the load connected across output voltage $V_{out}$.

Error amplifier circuit 123 monitors output voltage $V_{out}$, and compares it with a reference voltage $V_{ref}$. The result of the comparison is a galvanically isolated error signal which is used as an input to PWM controller 124. Monitoring circuit 125 monitors the voltage across $V_{in}$ and inductor 114. It detects the appropriate condition for ZVT and its output is also used by PWM controller 124. As will be discussed more fully with reference to FIG. 2, after clamping switch 115 is turned off, the voltage across the switches in the full-bridge reaches zero. Monitoring circuit 125 detects this condition and signals PWM controller 124 which then turns on the appropriate diagonal, either switches 103 and 106 or switches 104 and 105.

Figure 2:
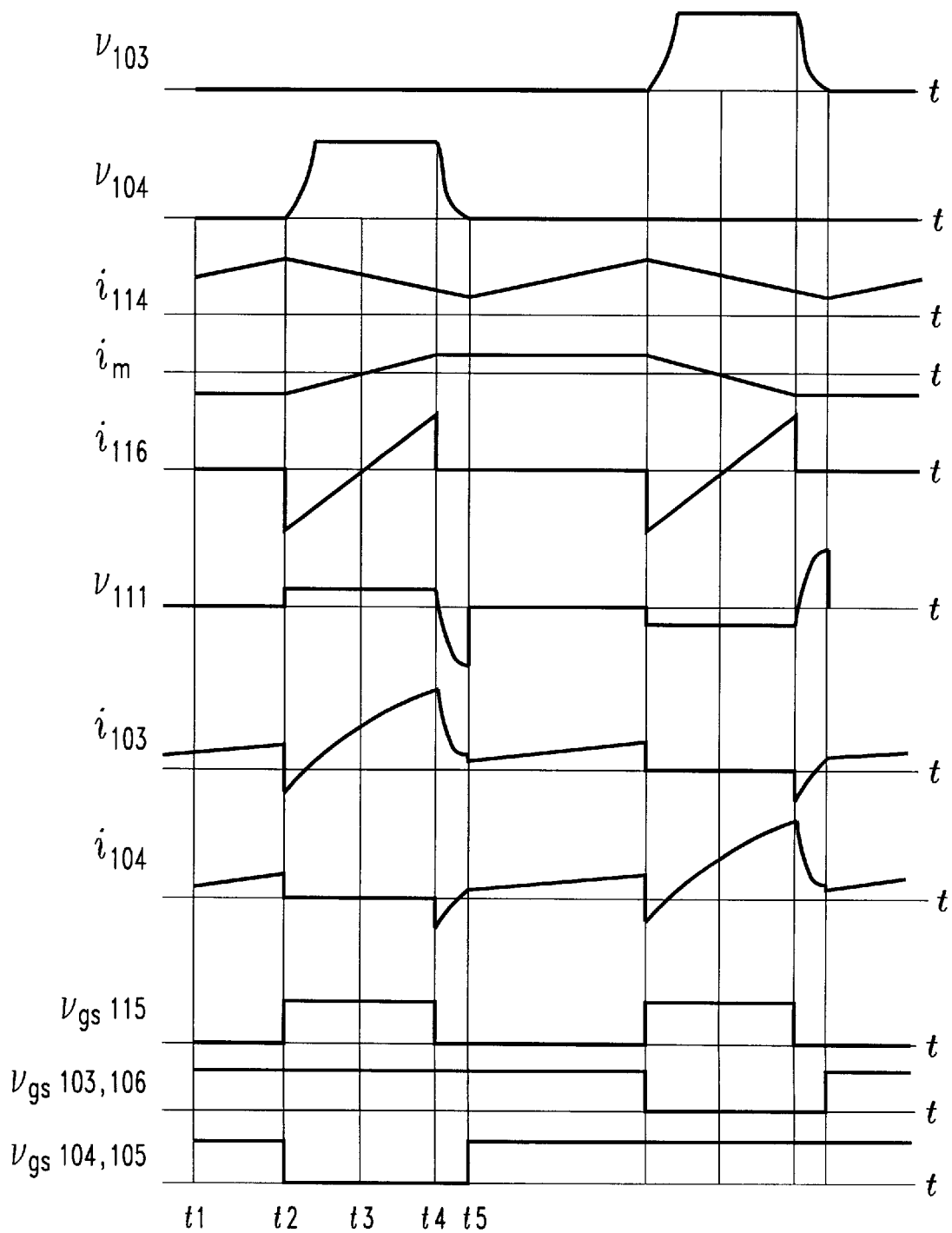
FIG. 2 is a timing diagram for the circuit of FIG. 1.

Referring now to FIG. 2, a timing diagram is shown which demonstrates the operation of the circuit shown in FIG. 1. The timing diagram shows various circuit parameters from the circuit in FIG. 1 including the magnetizing current of transformer 110 denoted as $i_m$. The operation of the circuit will be described during one switching cycle broken down into four time intervals.

During the interval from t1 to t2 switches 103, 104, 105, and 106 are conducting and clamping switch 115 is turned off, as shown by $V_{gs}$ 115, $V_{gs}$ 103,106, and $V_{gs}$ 104,105. Thus, the primary winding of transformer 110 is effectively shorted and its magnetizing current $i_m$ is circulating within the shorted winding and maintains a constant level. Boost inductor 114 is effectively connected across source $V_{in}$ and is accumulating energy, shown by the ramping up of the inductor current $i_{114}$. Voltage across the center tapped winding of transformer 110 is zero, and output current is supplied by the discharge of energy stored in output capacitor 122.

Interval t2 to t3 corresponds to the state in which switches 103 and 106 are on and conducting, switches 104 and 105 are off and not conducting, and clamping switch 115 is turned on. In this state clamping capacitor 116 is effectively connected across the primary winding of transformer 110 and its lump inductance 111. Initially, all of the inductor current $i_{114}$ is diverted into clamping capacitor 116, charging it through the body diode of clamping switch 115. The primary current, here $i_{103}$ since switches 103 and 106 are conducting, ramps up at a rate determined by the leakage inductance shown by lump inductance 111. By time t3, the primary current $i_{103}$ reaches the level of inductor current $i_{114}$. At time t3 all of the inductor current $i_{114}$ is flowing in the primary winding of transformer 110 and clamping capacitor current $i_{116}$ is zero. The path for magnetizing current $i_m$ is provided through switches 103 and 106, and clamping switch 115.

From t3 to t4, all switches maintain their previous state. Primary current, still $i_{103}$, keeps ramping up, driven by the voltage across clamping capacitor 116 which exceeds the instantaneous current in inductor 114. When time t4 is reached, primary current $i_{103}$ is at its maximum which is equal to the sum of twice the average inductor current $i_{114}$ and the transformer magnetizing current $i_m$. Also, during this interval, output capacitor 122 is replenishing the energy used to supply the output current during the $t_1$ to t2 interval.

Finally, at interval t4 to t5, clamping switch 115 is turned off terminating the current flowing through the primary as a result of clamping capacitor 116. The diminishing magnetic field in the leakage inductance shown by lump inductance 111 forces the reversal of its voltage polarity which causes the discharge of the parasitic capacitance in the previously nonconducting switches 104 and 105. This process is completed by time t5 when the voltage across the bridge switches 103, 104, 105, and 106 is zero. At t5 monitoring circuit 125 detects the zero voltage condition across those of bridge switches 103, 104, 105 and 106 which were conducting, and signals the PWM controller 124 to turn on the previously nonconducting switches, which in this case are switches 104 and 105.

After time t5, the circuit condition is analogous to the interval t1 to t2, except with the opposite diagonal of the bridge, switches 104 and 105, about to conduct.

Figure 3:
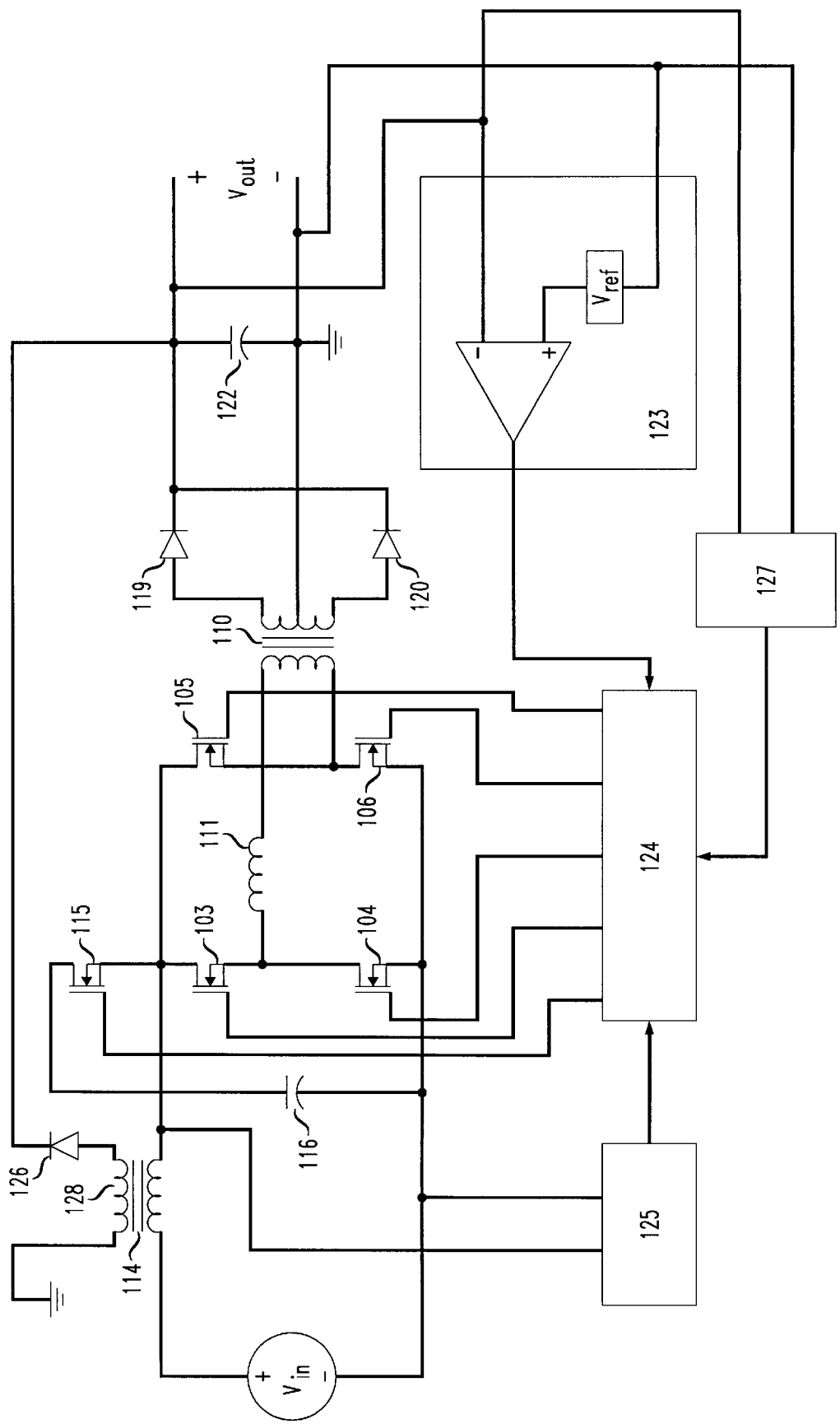
FIG. 3 is a circuit diagram of a converter according to the present invention with ancillary start-up circuitry.

FIG. 3 shows a variation on the preferred embodiment of the present invention. Normal steady state operation presupposes a small voltage difference between clamping capacitor 116 and the reflected voltage across output capacitor 122. This is not the case at turn on. Some provision should be taken to prevent excessive currents charging the output capacitor 122. The circuit of FIG. 3 demonstrates one of the many ways to precharge output capacitor 122. Introduction of secondary winding 128 coupled to boost inductor 114 allows the introduction of a start-up mode where the boost inductor 114 operates in a flyback mode.

During this start-up mode the circuit of FIG. 3 operates by switching all of the bridge switches 103, 104, 105, and 106 on and off at a preset duty cycle. Clamping transistor 115 is driven 180 degrees out of phase with the bridge switches. During the portion of the start-up mode when bridge switches 103, 104, 105, and 106 are off and clamping switch 115 is on, boost inductor 114 delivers stored energy to output capacitor 122 via secondary winding 128 and diode 126. Start-up mode is continued until the voltage across output capacitor 122 reaches the desired value, as detected by start up monitoring circuit 127. At that point the circuit begins its normal mode of operation.

Figure 4:
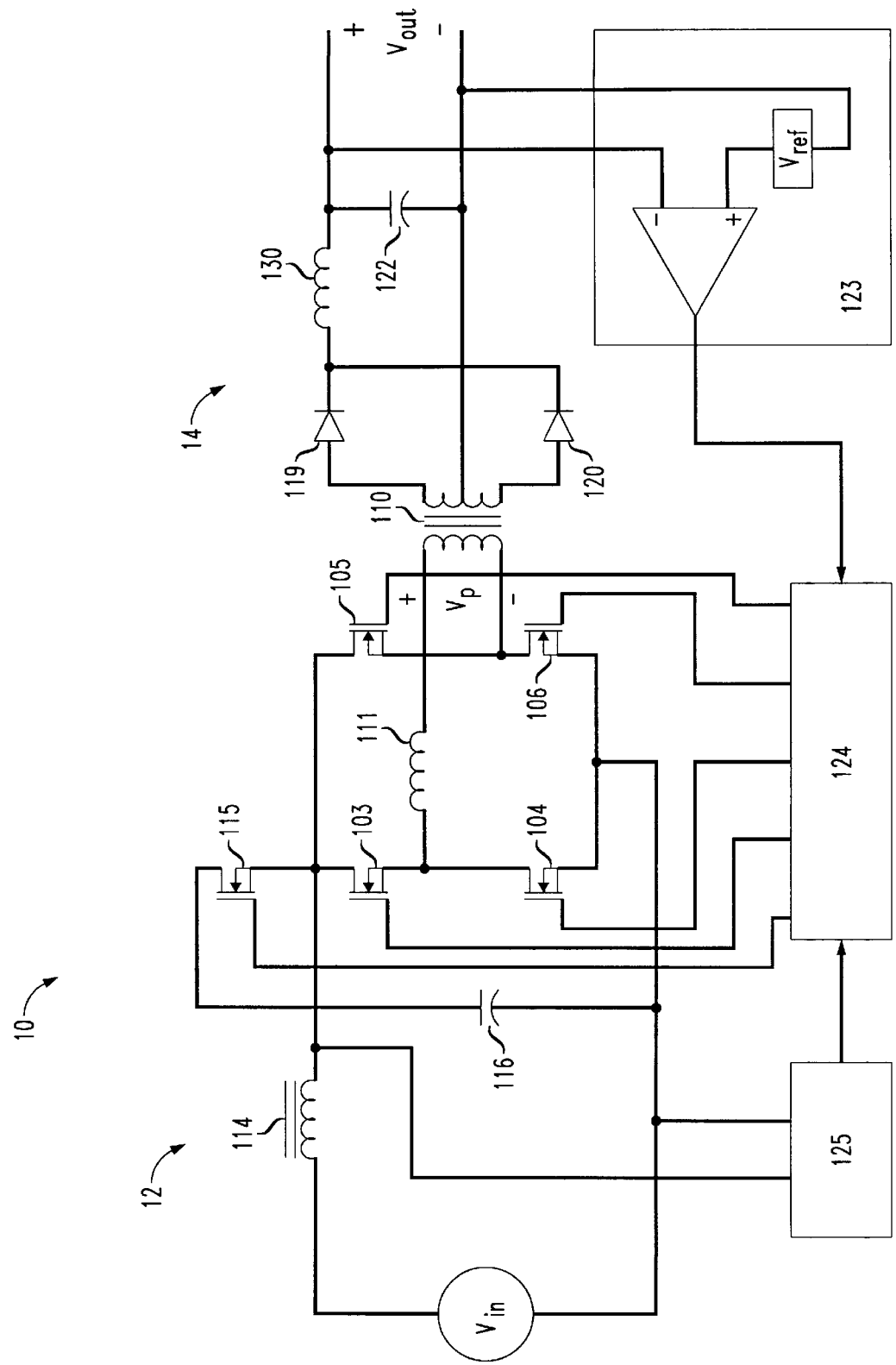
FIG. 4 is a circuit diagram for a converter according to the present invention with an LC filtered output circuit.
Figure 5:
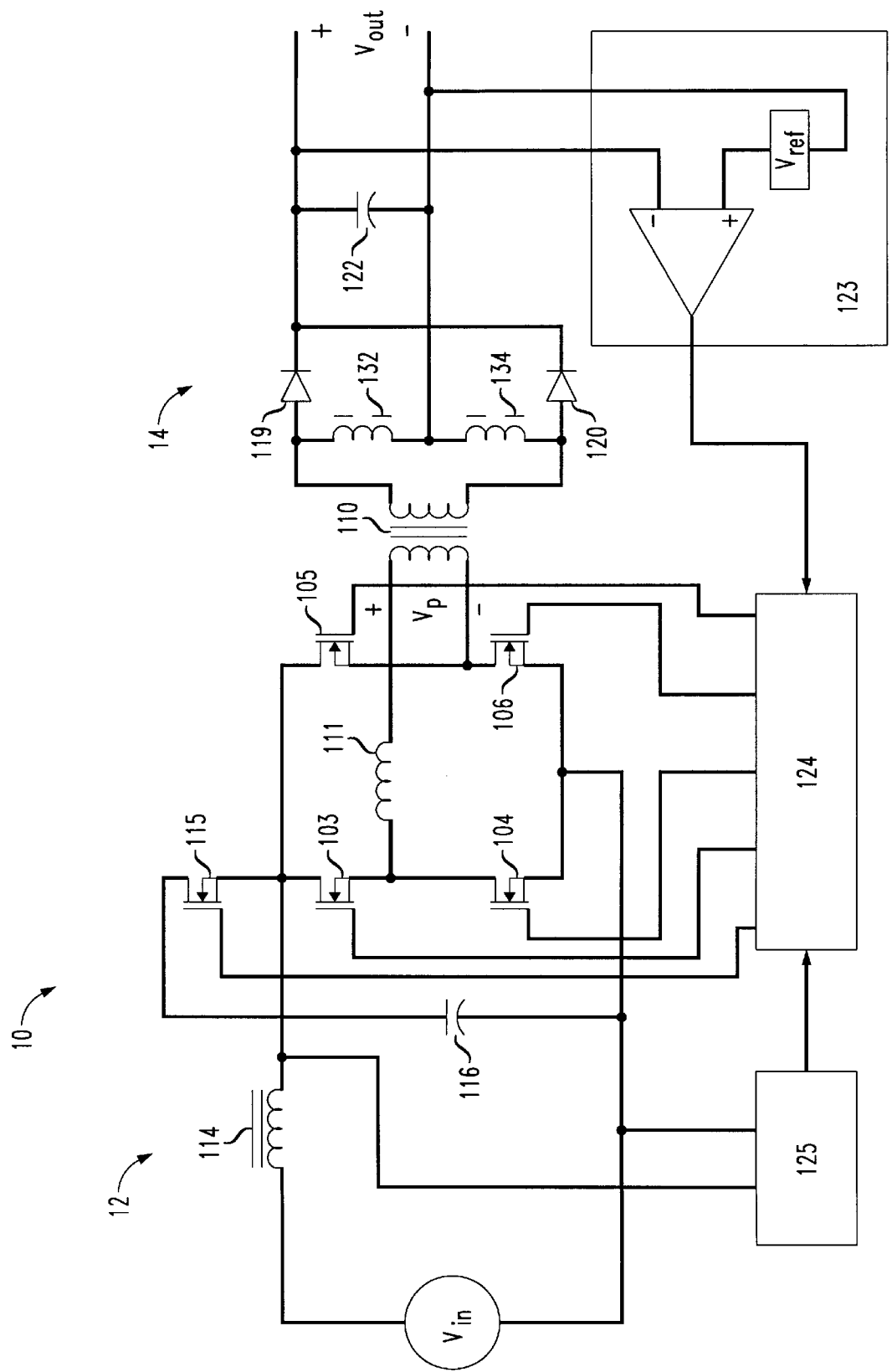
FIG. 5 is a circuit diagram for a converter according to the present invention with an alternate LC filtered output circuit.

FIGS. 4 and 5 show converter topologies incorporating the present invention with LC filtered outputs, instead of the capacitive outputs shown in FIGS. 1 and 3. Capacitive output filtering is standard in current fed converters, however, the use of the active clamp circuit formed by MOSFET clamping switch 115 and clamping capacitor 116 allows inductor 130 of FIG. 4, or inductors 132 and 134 of FIG. 5, to be placed in output circuit 14. Inductor 130 of FIG. 4 and inductors 132 and 134 of FIG. 5 make output circuit 14 an LC filtering output which has advantages over the purely capacitive output circuits of FIGS. 1 and 3. Additionally, the use of LC filtering in output circuit 14 of FIGS. 4 and 5 eliminates the need for any start-up circuitry such at that described with respect to FIG. 3.

All of the elements shown in FIGS. 1, 3, 4 and 5 are standard electrical components, and are commonly available. The switches used can be commonly available MOSFETs of appropriate current and voltage rating. The control and monitoring circuitry used consists of commonly available ICs such as PWM controllers, logic gates, operational amplifies and comparators.

It is to be understood that although the invention has been described with particular reference to specific embodiments thereof, the form of the invention shown and described in detail is to be taken as the preferred embodiment of same, and that various changes and modifications may be resorted to without departing from the spirit and scope of the invention as defined by the appended claims.

What is claimed:

1. A full-bridge isolated current fed power converter for providing a load with a DC output voltage and current from a source voltage comprising:

a transformer;

an input circuit connected to the transformer and including a switching network which connects the source voltage across the transformer and a boost inductor which supplies current to the transformer;

an output circuit coupled to the input circuit by the transformer, and providing the load with the DC output voltage and current;

a non-oscillating, active clamp circuit formed by a clamping switch transistor and a clamping capacitor connected to the input circuit to provide zero voltage transitions in the switching network and limit the switching network voltage;

a controller connected to the switching network and active clamp circuit, the controller active to monitor circuit conditions and driving the switching network and active clamp circuit to provide the DC output voltage; and a monitoring circuit which monitors the voltage across the switching network and signals the controller when a zero voltage condition is present, such that the controller can then drive the switching network.

2. The power converter of claim 1 wherein the switching network is a full-bridge circuit comprising four switch transistors.

3. The power converter of claim 1 further comprising a secondary winding coupled to the boost inductor and a diode connected between the secondary winding and an output capacitor in the output circuit, the secondary winding and the diode allowing the power converter to operate in a start-up mode to precharge the output capacitor.

4. The power converter of claim 1 wherein the output circuit is an LC filtering circuit.

5. The power converter of claim 1 wherein the source voltage is a rectified AC line voltage.

6. A full-bridge isolated current fed converter for providing power to a DC load from a source comprising:

four switches forming a full-bridge circuit;

a boost inductor connected to the source and the full-bridge circuit;

a transformer connected to the full bridge circuit, the transformer being connected for receiving power from the source through the full-bridge circuit;

an output circuit coupled to the source through the transformer;

a non-oscillating active clamp circuit which includes a clamping switch and a clamping capacitor connected to the full-bridge circuit, the active clamp circuit providing zero voltage transitions and voltage limitation for the full-bridge circuit and proving a path for magnetizing current from the transformer;

a PWM controller connected to the four switches of the full-bridge circuit and to the active clamp circuit, the controller driving the four switches and the active clamp circuit to provide DC power to the DC load; and a monitoring circuit which monitors the voltage across the switching network and signals the controller when a zero voltage condition is present, such that the controller can then drive the switching network.

7. The power converter of claim 6 further comprising a secondary winding coupled to the boost inductor and a diode connected between the secondary winding and an output capacitor in the output circuit, the secondary winding and the diode allowing the power converter to operate in a start-up mode to precharge the output capacitor.

8. The power converter of claim 6 wherein the output circuit is an LC filtering circuit.

* * * * *